(12) United States Patent
Flanagan (10) Patent No.: US 6,858,104 B2
(45) Date of Patent: Feb. 22, 2005

(54) APPARATUS AND METHOD FOR CLOSED-LOOP CONTROL OF LASER WELDER FOR WELDING POLYMERIC CATHETER COMPONENTS

(75) Inventor: Aiden Flanagan, Galway (IE)

(73) Assignee: SciMed Life Systems, Inc., Maple Grove, MN (US)

( * ) Notice: Subject to any disclaimer, the term of this patent is extended or adjusted under 35 U.S.C. 154(b) by 246 days.

(21) Appl. No.: 10/059,634

(22) Filed: Jan. 28, 2002

(65) Prior Publication Data

US 2003/0141002 A1 Jul. 31, 2003

(51) Int. Cl.[7] .............................................. B32B 31/28
(52) U.S. Cl. .................. 156/64; 156/275.5; 156/272.8; 156/304.2; 156/306.6
(58) Field of Search ............................... 156/64, 272.8, 156/275.5, 304.2, 306.6, 293, 294, 296, 303.1; 219/121.61, 121.62, 121.63, 121.64

(56) References Cited

U.S. PATENT DOCUMENTS

| | | |
|---|---|---|
| 3,974,016 A | 8/1976 | Bondybey et al. |
| 4,121,087 A | 10/1978 | Malmuth et al. ........... 219/121 |
| 4,251,305 A | 2/1981 | Becker et al. |
| 5,096,634 A | 3/1992 | Tsadares et al. |
| 5,267,959 A | 12/1993 | Forman |
| 5,272,312 A | 12/1993 | Jurca |
| 5,279,693 A | 1/1994 | Robinson et al. |
| 5,283,416 A | 2/1994 | Shirk |
| 5,354,323 A | 10/1994 | Whitebook ................... 607/89 |
| 5,501,759 A | 3/1996 | Forman |
| 5,674,415 A | 10/1997 | Leong et al. |
| 6,042,578 A * | 3/2000 | Dinh et al. .................. 604/527 |
| 6,485,599 B1 * | 11/2002 | Glownia et al. ......... 156/272.8 |

OTHER PUBLICATIONS

PCT International Search Report, PCT/US03/01856 (2 pages).

* cited by examiner

Primary Examiner—Chris Fiorilla
Assistant Examiner—George Koch
(74) Attorney, Agent, or Firm—Kagan Binder, PLLC (57) ABSTRACT

A method for forming a fusion bond between polymeric materials. Preferably, a detector detects thermal radiation being emitted from a fusion bond site while a laser beam impinges on and heats at least a portion of the bond site. In an aspect of the present invention the detector can provide an electrical signal to a signal processor for controllably adjusting the laser beam power. In another aspect of the present invention, the electrical signal may be substantially correlated to the temperature of at least a region of the bond site. The present invention is also directed to an apparatus for forming a fusion bond between polymeric materials. The apparatus includes a workpiece support, a laser, a detector, and a signal processor. The workpiece support preferably positions a first and second polymeric body so that a fusion bond site is formed. The laser impinges on at least a portion of the fusion bond site such that it emits thermal radiation. The detector senses the thermal radiation and preferably provides a signal to the signal processor. In an aspect of the present invention, the signal processor controllably adjusts the power of the laser beam based on the signal provide by the detector.

44 Claims, 9 Drawing Sheets

APPARATUS AND METHOD FOR CLOSED-LOOP CONTROL OF LASER WELDER FOR WELDING POLYMERIC CATHETER COMPONENTS

TECHNICAL FIELD

The present invention relates to bonding of catheter components, which catheters are employed in medical procedures such as angioplasty and stent delivery procedures, and more particularly to a weld bonding method and apparatus that utilizes laser energy for effectively welding together polymeric components, such as medical catheter components.

BACKGROUND OF THE INVENTION

Many types of catheters have been developed for treating problems and diseases of body systems including the vascular, pulmonary, lymphatic, urinary, and other body systems that include one or more body lumens. Such catheters advantageously provide treatment by generally non-invasive techniques by permitting manipulation of distal features of such catheters from their proximal ends. These catheters may be made up of many components with properties selectively chosen for specific functions. And as a result, it is generally desirable to combine different components to obtain particular control aspects of such catheters. Generally, polymeric materials are used for such catheters because of medical use conditions and sanitation requirements and the like.

In particular, balloon catheters are frequently used to treat intravascular diseases by generally non-invasive techniques such as percutaneous transluminal angioplasty (PTA) and percutaneous transluminal coronary angioplasty (PTCA) and may include techniques for delivering medical devices such as stents and the like. These therapeutic angioplasty catheterization techniques are well known in the art and typically involve the use of a balloon catheter with a guide wire. A typical balloon catheter has an elongate shaft with an inner lumen and has a dilatation balloon attached proximate the distal end and a manifold attached proximate the proximal end. Typically these catheters are designed to be introduced into a body lumen over the guide wire which is slidably received within the inner lumen of the catheter. In use, the balloon catheter is advanced over the guide wire such that the dilatation balloon is positioned adjacent a restriction in a diseased vessel. Then, fluid under pressure is supplied to the balloon through the catheter lumen, expanding the balloon and opening the restriction in the vessel.

For stent delivery, systems have been developed utilizing catheters as part of the stent delivery system. In some applications, balloon catheters may be used to deliver stents where a stent can be delivered to a desired treatment site as a collapsed structure provided about a balloon. At the site, the balloon can be expanded to set the stent in place. Other stents, such as self-expanding stents, may also be delivered by catheter systems. In such a system, a catheter may be used to deliver a self-expanding stent to a treatment site, wherein the stent may be constrained by an outer sheath. Once the stent is properly positioned by manipulating the catheter, the outer sheath can be pulled away, such as by pulling a wire connected to the outer sheath, thereby allowing the self-expanding stent to expand and set in place.

In order to achieve a combination of desired properties at different parts of the catheters themselves, catheters have been developed by combining a plurality of tubing components together to define a catheter lumen. That is, a portion of the overall length of a catheter lumen may comprise a different tubing type component than another. These one or more portions may comprise tubing components of different physical characteristics and/or different materials. For example, a tip portion may be provided that is more resilient than the remainder of the catheter lumen for better crossability and to provide a softer leading end of the catheter for abutting body internal membranes and the like. Different materials include different polymeric materials from one another, for example, or similar polymers of different densities, fillers, crosslinking or other characteristics. In particular, a portion of a catheter lumen may comprise a material chosen for flexibility to follow a body lumen's path while another portion may comprise a material chosen for axial and/or torque transmission.

Balloons for use with these catheters are frequently prepared from a variety of polymeric materials depending on their intended use. Generally, these materials are required to possess elastomeric properties such that the dilatation balloon has the requisite compliance. That is, the balloon has a predetermined relationship between balloon diameter and dilatation pressure. Moreover, such balloons must be able to resist bursting at the relatively high pressures commonly employed during these procedures. Because some catheter component materials typically may not possess elastomeric properties for a particular application, the balloons can be prepared from a polymeric material which is different from, and is not readily bonded to, the material employed to fabricate the catheter.

In one well-known approach for joining dilatation balloons to catheters, resistance heated copper jaws are utilized to press the respective balloon shafts onto and against the catheter while the fusion takes place. A problem though is that the balloon and catheter may be deformed by the direct application of heat. Such application of heat can deform the balloon and catheter material and form small, random channels at the balloon to catheter interface. These channels are known to contribute to variations in the strength of different bonds and may cause generally poorly bonded balloons. To compensate for this variance, bonds are usually given a sufficient length to provide the requisite strength. Directly applied heat also may cause crystallization and stiffening of the balloon and catheter material, not only at the bond site, but also in both directions axially of the bond. Disadvantages that may arise from crystallization and stiffening at and around the bond include impeded trackability and crossability as well as reduced maneuverability.

Other approaches to bonding avoid the use of copper jaws, for example, U.S. Pat. No. 4,251,305 to Becker et al., the entire disclosure of which is incorporated herein by reference. Becker discloses a non-contact method for heat sealing a balloon onto a catheter. A length of thin tubing is slid over an elongated shaft of the catheter. Shrink tubing is installed over the thin walled tubing at its ends, and overlapping the shaft, and partially shrunk. Then, lamps provide further radiant energy to form gradually tapering thermoplastic joints that bond the tubing and shaft. The device employed for bonding utilizes three lamps that emit energy along the visible and infrared spectra. Each lamp is situated near an elliptical reflector, at one of the loci of the ellipse. The bond or treatment area is near the other focus. This approach avoids the problems arising from mechanical squeezing from the copper jaws, but some axial conductive heat transfer can still occur, which may be undersirable.

Another technique for bonding dilatation balloons and catheters involves directing laser energy along a fusion bond site. One such laser process is disclosed in U.S. Pat. No. 5,501,759 to Forman, the entire disclosure of which is incorporated herein by reference. In one embodiment, the invention of Forman may be used to weld an annular interface of a catheter and dilatation balloon. In this embodiment, a beam of laser energy is directed substantially at the annular interface. Then, the beam can be moved in an annular path along the interface, relative to the catheter and the dilatation balloon. This is accomplished by mounting the catheter and dilatation balloon concentrically on an axis, and rotating the catheter and dilatation balloon about the axis while maintaining the beam stationary. As an alternative, the catheter and dilatation balloon can be maintained stationary while optomechanical means can be used to rotate the beam.

Such laser welding techniques for raising the temperature of polymeric materials typically utilize a predetermined static laser power over a short pulse or multiple pulses. As such, the temperature of the polymeric material rises from the beginning of the weld pulse to the end of the weld pulse in a generally linear manner. This can cause the properties of the bonded region to vary undesirably. Moreover, variations in the material contact and seam condition for individual balloon catheters may further lead to variations in the properties of the bonded region.

SUMMARY OF THE PRESENT INVENTION

The present invention overcomes the disadvantages and shortcomings of the prior art by providing methods and apparatuses for fusion bonding plural components. In particular, this present invention provides methods and apparatuses for fusion bonding polymeric components. Preferably, a detector senses thermal radiation from a bond site to be correlated to the temperature of the material at the bond site. More preferably, the sensed thermal radiation is utilized to provide feedback information to an energy source, such as a laser, that controls the thermal energy that is transferred to the bond site. The present invention is particularly applicable to fusion bonding small components of medical devices such as catheter components having generally small bonds.

In one aspect of the present invention a method for forming a fusion bond between polymeric materials includes the steps of forming a bond site, directing laser energy to the bond site, detecting the infrared radiation emitted from the bond site, converting the detected radiation to an electrical signal, and controllably adjusting the laser energy based on the signal. Preferably, the bond site is formed by positioning a portion of a first body with respect to a portion of a second. Laser energy is preferably directed onto at least a portion of the bond site so that a fusion zone having an increased temperature is formed. The emissive power spectrum of infrared radiation being emitted from the fusion zone is preferably detected while directing the laser energy onto the bond site. Preferably, the detected emissive power spectrum of infrared radiation is converted into an electrical signal. The electrical signal may be utilized to controllably adjust the laser energy that is directed onto the bond site based on the electrical signal. As such the electrical signal may be used to controllably obtain an emissive power spectrum of infrared radiation emitted from the fusion zone.

In another aspect of the present invention an apparatus for forming a fusion bond between polymeric materials is provided. Preferably, the apparatus includes a workpiece support, a laser, a detector, and a control system. Preferably, the workpiece support is provided for supporting and positioning a portion of a first body with respect to a portion of a second polymeric body so that a fusion bond site is formed. A laser having an adjustable laser beam for illuminating at least a portion of the bond site and thereby forming a fusion zone having an increased temperature is preferably utilized. Preferably, a detector for detecting the infrared radiation emitted from the fusion zone while the bond site is being illuminated by the laser beam is provided. Preferably, the detector provides a detector signal based on the emissive power spectrum. In an aspect of the present invention the detector signal is substantially correlated with the temperature of the fusion zone. A control system is preferably provided for receiving the detector signal and used for adjusting the power of the laser beam to obtain a predetermined emissive power spectrum for the infrared radiation being emitted from the fusion zone.

In an aspect of the present invention, the detector can preferably comprise an infrared detector or pyrometer that senses infrared radiation being emitted from the bond site. More preferably, the detector senses infrared radiation being emitted from a fusion zone and is correlated with the temperature of the fusion zone. The infrared radiation sensed by the detector is preferably used to control the power of the laser source. An infrared detector is advantageously preferred because infrared radiation is typically emitted in every direction from a hot surface, such as from a fusion zone of a bond site comprising materials that are being fusion bonded. Such as plural polymeric materials or a combination of polymeric materials and non-polymeric materials such as stainless steel. Also, infrared detectors are capable of accurately reading such emissions even where very little infrared radiation is emitted as a result of the relatively low temperatures used for fusion bonding polymeric materials and the relatively small areas that are heated.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this specification, illustrate several aspects of the invention and together with the description of the preferred embodiments, serve to explain the principles of the invention. A brief description of the drawings is as follows.

DETAILED DESCRIPTION OF THE PREFERRED EMBODIMENTS

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to methods and apparatuses for effectively bonding components of polymeric materials together, and in particular for bonding components of medical devices, such as catheters. Additionally an aspect of the present invention may be used to bond polymeric materials to non-polymeric materials such as metals, for example, stainless steel as well as other non-polymeric materials such as ceramics and glasses. In particular, the present invention can advantageously provide the ability to bond tubular components of polymeric materials together as are usable for making up components of medical catheters of all types. Such catheters, themselves, are known for treating problems and diseases of the body in that they are made for introduction within any number of body passages or lumens, such as are provided within the vascular, urinary, and other such systems that include one or more body lumens. Therapeutic catheterization techniques may involve the use of a guide wire that is first controllably inserted within the body up to and beyond the treatment site within such body lumen. Thus, in order to follow such a guide wire to a treatment site, catheter lumens have been developed that comprise one or more tubular components that can be slid along the guide wire to the appropriate treatment site.

In general, dilatation balloon catheters are preferably designed to optimize pushability, trackability, crossability, and torque transmission to the distal catheter end as such is applied to the proximal end of the catheter. In accordance with the present invention pushability may be defined as the ability to transmit force from the proximal end of the catheter to the distal end of the catheter. A catheter shaft preferably has adequate strength for pushability and resistance to buckling or kinking. Trackability may be defined for the purpose of this application as the ability to navigate tortuous vasculature. That is, the distal portion of the catheter preferably tracks the guidewire through small tortuous vessels to reach the area to be treated. A more flexible distal portion is known to improve such trackability. Thus, it may be desirable to provide a catheter shaft with material properties to improve flexibility. In accordance with the present invention, crossability may be defined as the ability to navigate the balloon catheter across narrow restrictions or obstructions in the vasculature.

Optimization of pushability, trackability, crossability, and torque transmission may be accomplished by carefully choosing the catheter material and physical characteristic such as wall thickness. Because these catheters are frequently inserted for long distances, it is generally desirable to minimize the friction between the guide wire and the surface of the catheter lumen by constructing the catheter from a lubricous material such as a high-density polyethylene or similar material. Polymeric materials are known primarily for these uses. For example, balloons are frequently formed from polyethylene terephthalate (PET) as well as nylon, co-polymers, block polymers, polymer blends, etc. As such, techniques are needed to provide bonds between catheter materials and dilatation balloon materials that are consistent, fluid tight, and of sufficient strength to withstand the fluid pressures involved in balloon dilatation without sacrificing pushability, trackability, crossability, and torque transmission.

In order to achieve a combination of desired properties at different parts of the catheters themselves, catheters have been developed by combining a plurality of tubing components together to define a catheter lumen. That is, a portion of the overall length of a catheter lumen may comprise a different tubing type component than another. These one or more portions may comprise tubing components of different physical characteristics and/or different materials. For example, a tip portion may be provided that is more resilient than the remainder of the catheter lumen for better crossability and to provide a softer leading end of the catheter for abutting body internal membranes and the like. Different materials include different polymeric materials from one another, for example, or similar polymers of different densities, fillers, crosslinking or other characteristics. In particular, a portion of a catheter lumen may comprise a material chosen for flexibility to follow a body lumen's path while another portion may comprise a material chosen for axial and/or torque transmission.

Laser welding of polymeric materials, as known, is an advantageous manner of bonding such polymers, including, in particular the laser welding of catheter components. Lasers, however, are desirably controlled to avoid creating too little or too much heat to get an optimized weld, which is even more difficult when welding plural different polymers. The present invention enhances those welding benefits that are achievable by laser welding by controlling the generation of heat and the temperature of the bond site.

Figure 1:
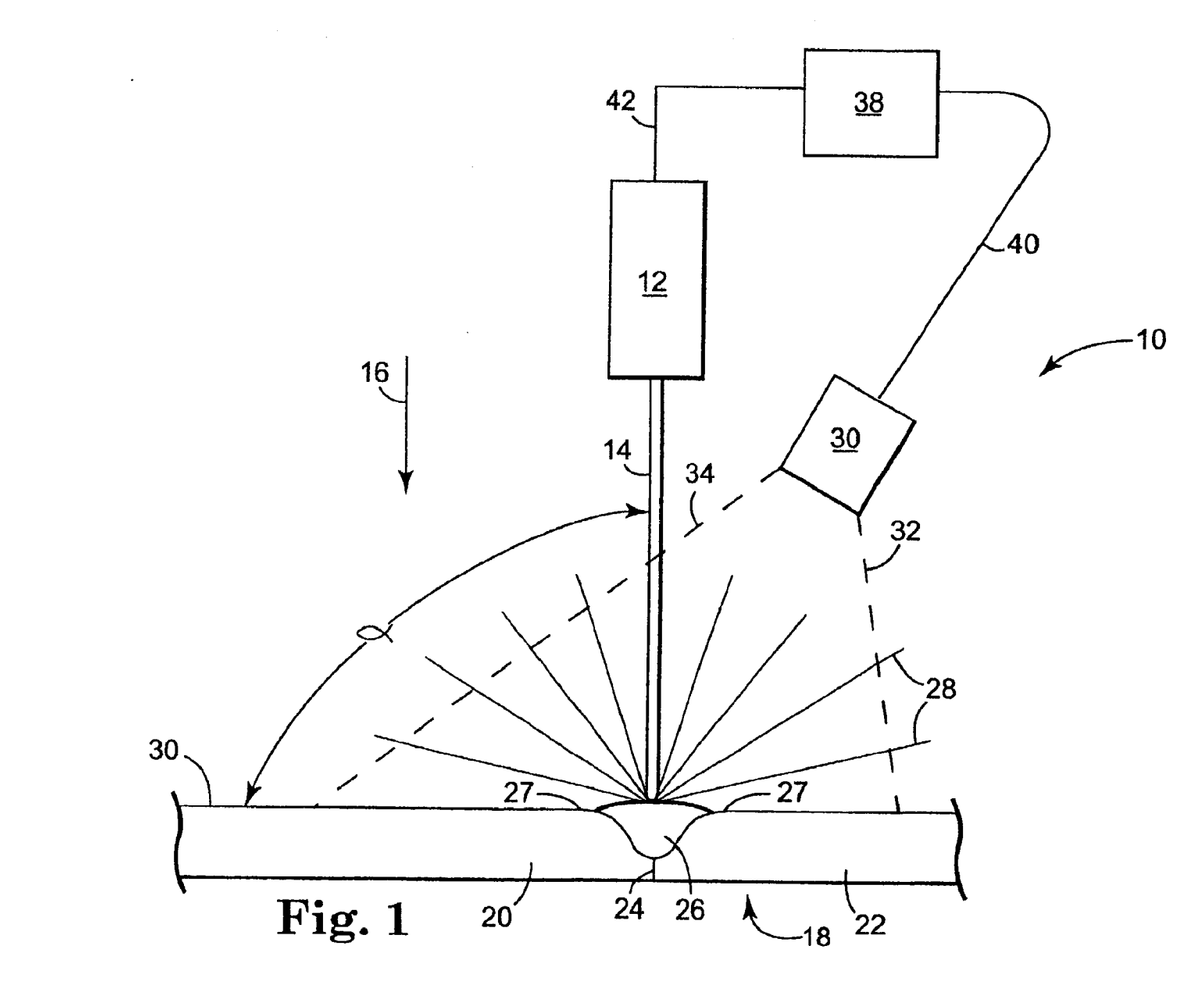
FIG. 1 is a schematic illustration of a laser welding apparatus in accordance with the present invention showing in particular a detector in an off axis configuration.

In FIG. 1, a schematic illustration of one embodiment of a welding system 10 for welding polymeric materials in accordance with the present invention is shown. In particular, the welding system 10 that is shown and will be described below is particularly designed for bonding polymeric balloon catheter components and/or plural tubular polymeric catheter components together. However, the welding system 10 may additionally be utilized to bond a polymeric material to a non-polymeric material such as stainless steel. In a welding system 10 according to the present invention, a laser 12 is utilized, which will be described in greater detail below, the purpose of which is to controllably create thermal energy that is needed to weld polymeric components together. In this process, the laser 12 transmits a laser beam 14 in the direction generally indicated by arrow 16. Preferably the laser is a $CO_2$ laser, in which case the wavelength of the laser beam 14 is about 10.6 microns. It is understood that any laser may be used such that the functional aspects of the present invention are accomplished. For example, lasers such as diode lasers having a wavelength between about 0.8 to 1.2 microns and ND:YAG lasers having a wavelength of about 1 micron may be used. It is contemplated that the laser beam 14 may also be directed through optical devices such as lenses and collimators (not shown) for managing the laser beam in accordance with the present invention.

Preferably, laser energy having a wavelength in the far infrared range of about 10.6 micrometers is used. Generally, polymeric materials used for dilatation balloon catheters are highly absorptive of energy at this wavelength and most of the radiation is absorbed within a few millimeters from the surface. Catheters preferably have wall thicknesses less that about 1 millimeter and thus the polymer catheter is heated by a volumetric absorption of the radiation. As such, it follows that the temperature rise throughout the catheter wall thickness should be substantially uniform. This reduces the heating time required for melting the layer because heat conduction through the polymer is not substantially relied upon, as is the case with prior art hot jaw heating. To the contrary, conduction of heat through a polymer is very slow due to its low thermal conductivity. Using laser energy thus reduces the energy required to form the fusion bond, and substantially prevents any substantial crystallization and hardening of material in either direction from the bond site.

Preferably, the laser beam 14 impinges on a workpiece 18. In a preferred embodiment, the laser beam 14 impinges on the workpiece 18 at a substantially normal angle of incidence in order to efficiently utilize the laser beam power. Preferably, the angle of incidence α of the laser beam 14 on the workpiece 18 is between 45 degrees and 90 degrees from a surface 31. It is understood that, the laser beam 14 may impinge on the workpiece 18 at any angle provided that sufficient thermal energy is created for a specific application taking into account the one or more polymeric materials involved and the type of laser used.

Figure 6:
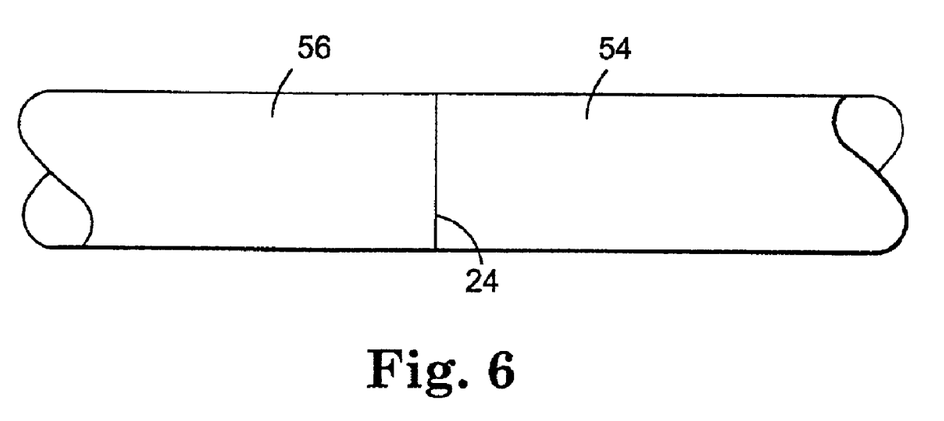
FIG. 6 is an illustration of a first and second catheter positioned to form a fusion bond site.
Figure 7:
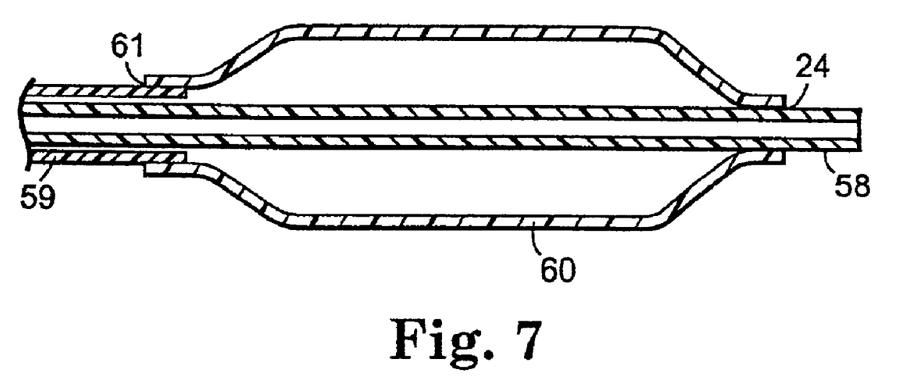
FIG. 7 is an illustration of a catheter and a dilatation balloon positioned to form a fusion bond site at a distal end thereof.

The workpiece 18 preferably includes a first polymeric body 20 and a second polymeric body 22 positioned, as schematically illustrated in FIG. 1, so that a fusion bond site 24 is formed. As illustrated in FIG. 7, the first polymeric body 20 and the second polymeric body 22 may be a tubular component, such as a catheter 58 and a dilatation balloon 60 to be bonded in accordance with one aspect of the present invention. As illustrated in FIG. 6, the first polymeric body 20 and the second polymeric body 22 may be a first tubular catheter component 54 and a second tubular catheter component 56 where the first tubular catheter component 54 is positioned with respect to the second tubular catheter component 56 to be bonded together at facing ends thereof, thus creating a bond site 24. Such a weld is commonly called a butt weld or joint. It is understood that the present invention may be utilized to create other weld techniques, such as lap welds and any other known or developed welding technique whereby components are located with at least portions thereof adjacent one another. And additionally, as described above such components may comprise both polymeric and non-polymeric components. Any such components are represented by the first and second polymeric bodys 20 and 22 respectively.

Preferably, the laser beam 14 impinges on the workpiece 18 at the fusion bond site 24 or at least close enough to it so that it can be effectively heated for forming at least a partial fusion bond. As described below, the impingement of the laser beam 14 on the workpiece 18 creates a fusion zone 26 having a generally increased temperature. Also as described below, the fusion zone 26 emits infrared radiation 28 as illustrated in FIG. 1. Generally, the fusion zone 26 corresponds to the region directly heated by the laser beam 14. As such, the fusion zone 26 may be generally circular, elliptical, rectangular, line-shaped, or annular or any combination thereof.

The welding system 10 preferably includes an infrared radiation detector or sensor 30, as shown in FIG. 1, the purpose of which in accordance with one aspect of the present invention, is to directly detect the thermal radiation 28 being emitted from the fusion zone 26 of the fusion bond site 24 to provide feedback to the laser 12 to control the output of the laser beam 14. In another aspect of the present invention, it is preferable to correlate the sensed thermal radiation 28 to the temperature of the fusion zone 26. That is, it is preferable to sense the temperature of the fusion zone 26 as opposed to the temperature of the material adjacent to the fusion zone 26 (as indicated by reference numeral 27 in FIGS. 1 and 2) because the actual fusion of the material takes place at the fusion zone 26 where the material is molten or softened such that a fusion bond may be formed. It is noted that the fusion zone 26 may comprise the entire bond site 24 or may comprise a portion of the bond site 24.

In accordance with the present invention, the fusion zone 26 temperature can advantageously be determined based on detected thermal radiation directly from the fusion zone 26 even where the polymeric components at the bond site 24 are softened or molten. That is, it is possible to get an accurate temperature reading directly from fusing zone as opposed to those closely affected adjacent material zones. Most preferably, the detector 30 comprises an infrared detector or pyrometer that senses the thermal radiation 28 that emmanates from the fusion zone 26 of the bond site 24 during the weld bonding process. As described in more detail below, any infrared detector is suitable for use in accordance with the present invention, but it is preferable that an infrared detector be selected that is sensitive to infrared readings as they are emmanated from polymeric materials at around their melting temperatures. For specific polymeric materials and desired weld bonding applications, different detection criteria may be used.

Preferably, the detector 30 is positioned so that it may receive thermal radiation 28 that is emitted from the fusion zone 26. The detector 30 generally has a particular field of view such as illustrated by dashed line 32 and dashed line 34 in FIGS. 1 and 2. As illustrated in FIG. 1, the detector 30 is positioned generally above the bond site 24 and to a side of the laser beam 14. Such an arrangement is generally referred to as an off axis arrangement because the detector 30 is positioned on an axis different from that of the laser beam 14.

Figure 2:
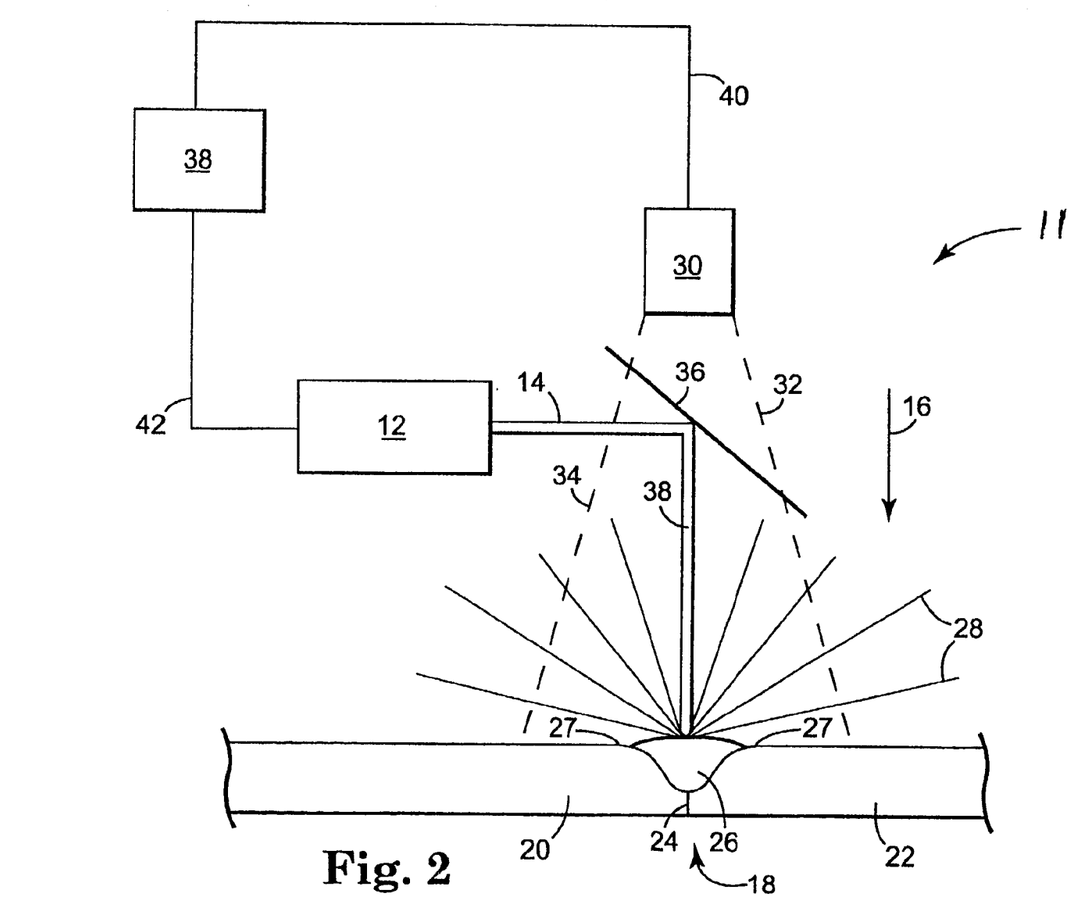
FIG. 2 is a schematic illustration of an alternative arrangement of the laser welding apparatus of FIG. 1 showing in particular the detector in an on axis configuration.

In FIG. 2, a variation of the welding system 10 of FIG. 1 is illustrated. In FIG. 2, an on axis arrangement of the detector 30 is shown. In the on axis configuration, the welding system 10 preferably also includes a mirror 36 for diverting the laser beam 14 so that the detector 30 may be positioned on axis with a portion of the laser beam 38 that is directed to the bond site 24. Preferably, the mirror 36 is positioned such that the laser beam 38 impinges the workpiece 18 at a generally normal angle of incidence. As above, other angular relationships are contemplated provided sufficient thermal energy is created to make at least a partial fusion bond. In a preferred embodiment, the mirror 36 is a dichroic mirror capable of diverting a sufficient percentage (preferably substantially all) of the laser beam 14 while simultaneously transmitting a sufficient percentage of infrared radiation 28 through the mirror 36 to the detector 30. Alternatively, a dichroic mirror capable of diverting the infrared radiation 28 while simultaneously transmitting the laser beam 14 through the mirror 36 to the detector 30 may be used. It is contemplated that any mirror, beamsplitter, bandpass filter, or arrangement thereof may be used such that the functional aspects of the present invention are realized.

In a preferred embodiment, the detector 30 is a high-sensitivity detector capable of measuring thermal emissions from polymeric materials at typical welding temperatures. Mercury-cadmium-telluride (HgCdTe or MCT) detectors are commercially available for measuring objects in accordance with the present invention such as polymers, at temperatures between 400K and 600 K (150° C. to 300° C.). Generally, an MCT detector is capable of measuring temperatures between 200 degrees Kelvin down to cryogenic temperatures of 77 Kelvin or lower. As such, cooling may be utilized to reduce the thermal signature (the infrared emissions) of the detector 30 itself. That is, because the detector 30 may be at a temperature near the temperature of the object being measured, substantial noise in the measurement signal may result because of radiation being emitted from the detector 30 itself and its immediate surroundings. The cooling means can be any suitable cooling system such as liquid nitrogen, electronic cooling using a Peltier element, Stirling cooling using a compressor, pulse-tube cooling, and J-T (Joule-Thomson) cooling using adiabatic expansion, etc. To perform cryogenic cooling, the use of liquid nitrogen or other cryogenic fluid, Stirling cooling, or pulse-tube cooling is desirable. It is contemplated that a detector such as a bolometer which detects infrared emission as heat requires no cooling and may used provided that the system generates intense signals or the detector has high sensitivity.

Preferably the detector 30 is capable of measuring thermal radiation at a wavelength range between 2 and 4 microns. This wavelength range is chosen by considering the material properties of particular polymeric materials and the fundamental laws of thermal radiation. Considering thermal radiation impinging on a surface, the radiation may be reflected away from the surface, absorbed by the material, or transmitted through the material in any combination thereof. As such, three fundamental radiative properties are defined: reflectivity, absorptivity, and transmissivity. Generally, these properties are expressed as percentages of the impinging radiation. Thus, the sum of the reflectivity, absorptivity, and transmissivity is unity. A black body surface may be defined as a surface that absorbs all incoming radiation. That is, the reflectivity and transmissivity are zero. All surfaces also emit thermal radiation. Accordingly, a black body surface at a particular temperature emits maximum thermal radiation for that temperature. The emissivity of a real surface may be defined as the ratio of energy emitted from the surface to the energy emitted by a black body surface at the same temperature. Accordingly, the emissivity of a black body surface is 1. A typical polymer has an emissivity of approximately 0.8–0.9 at a wavelength of about 3.4 microns. It also follows, that the emissivity is equivalent to the absorbance. Thus, absorbance spectra for typical polymeric materials may be utilized to determine the wavelength range for the detector 30 as described below.

Figure 3:
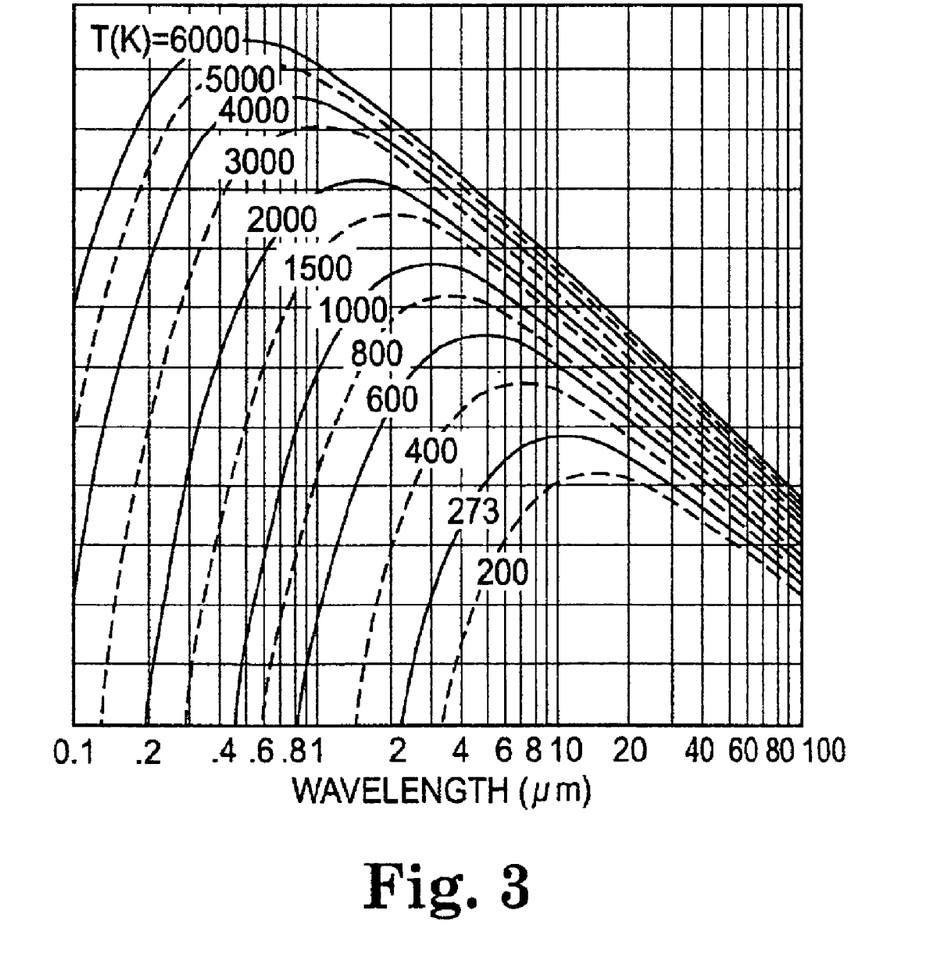
FIG. 3 is a graphical illustration of Planck's Law and illustrates in particular emissive power with respect to wavelength for varying temperatures.

As introduced above, an object at a temperature above absolute zero (−273.16 degrees Celsius) emits infrared radiation. Planck's Law, which is well known in the physical sciences, describes the behavior of such thermal radiation. As graphically shown in FIG. 3, Planck's Law describes the relationship between the infrared radiation emitted from an ideal black body at a particular temperature with respect to wavelength. Thus, FIG. 3 shows a family of curves for various temperatures showing the emissive power for wavelength values in the 0.1 to 100 micron region. In general, the infrared spectral range is from about 0.8 microns to 10 microns.

Referring to FIG. 3, and considering that typical polymeric materials usable in making catheter components such as lumens and balloons are welded at temperatures in the range of 400 K to 600 K (150° C. to 300° C.), the wavelength range for black body radiation at such temperatures may be determined. FIG. 3 indicates that a black body between the temperatures of about 400 K to about 600 K emits radiation at wavelengths of from about 0.8 microns to as great as 100 microns or more. Because most infrared radiation detectors are not capable of such a wide measurement range it is desirable to provide a narrower range for measurement. As such, the infrared radiation range is preferably chosen from the low wavelength side of an emission curve because there is a greater slope in the curve which results in better discrimination between temperatures as opposed to the high wavelength side where discrimination between temperatures is significantly more difficult. That is, a measurement range is preferably chosen where the emissive power for a particular temperature changes rapidly with respect to wavelength thus providing high resolution. Also, to avoid additional infrared noise from room temperature objects the wavelength range chosen is preferably less than about 4 microns. For welding polymer catheter materials, a preferred wavelength range for the detector 30 is therefore from approximately 2 microns to 4 microns. However, greater, smaller or different wavelength ranges are contemplated based upon the materials to be fusion bonded and/or the development of other sensor technology.

As described above, FIG. 3 illustrates the emissive power spectrum for a black body surface at different temperatures. However, real surfaces are typically not perfect emitters. As explained above, a real surface can be characterized by its emissivity. Thus, in choosing the appropriate wavelength range for the detector 30 the emissivity of the particular materials being utilized may be considered.

Polymeric materials that may be used for balloon catheters include, as examples, high density polyethylene (HDPE), Polyamides, the Polyetheramide copolymer family, HDPE with and without compatibilizers, low density polyethylene (LDPE), LDPE with and without compatibilizers, linear low density polyethylene (LLDPE), LLDPE with and without compatibilizers, polyethylene copolymers such as ethylene vinyl acetate copolymer (EVA) and other vinyl acetates, urethanes, polybutylene terephthalate (PBT), thermoplastic elastomers, isonomers, ethylene acrylic acid polymers, polyether block amide, and ethylene acrylic acid copolymer (EAA), polyurethane, polyesters such as polyethylene terephthalate (PET), polybutylene terephthalate (PBT), copolyesters such as Hytrel, other thermoplastic elastomers such as thermoplastic polyolefin (TPO), styrenic thermoplastic elastomers such as C-Flex, and ionomers such as Surlyn and any combination thereof.

Figure 4:
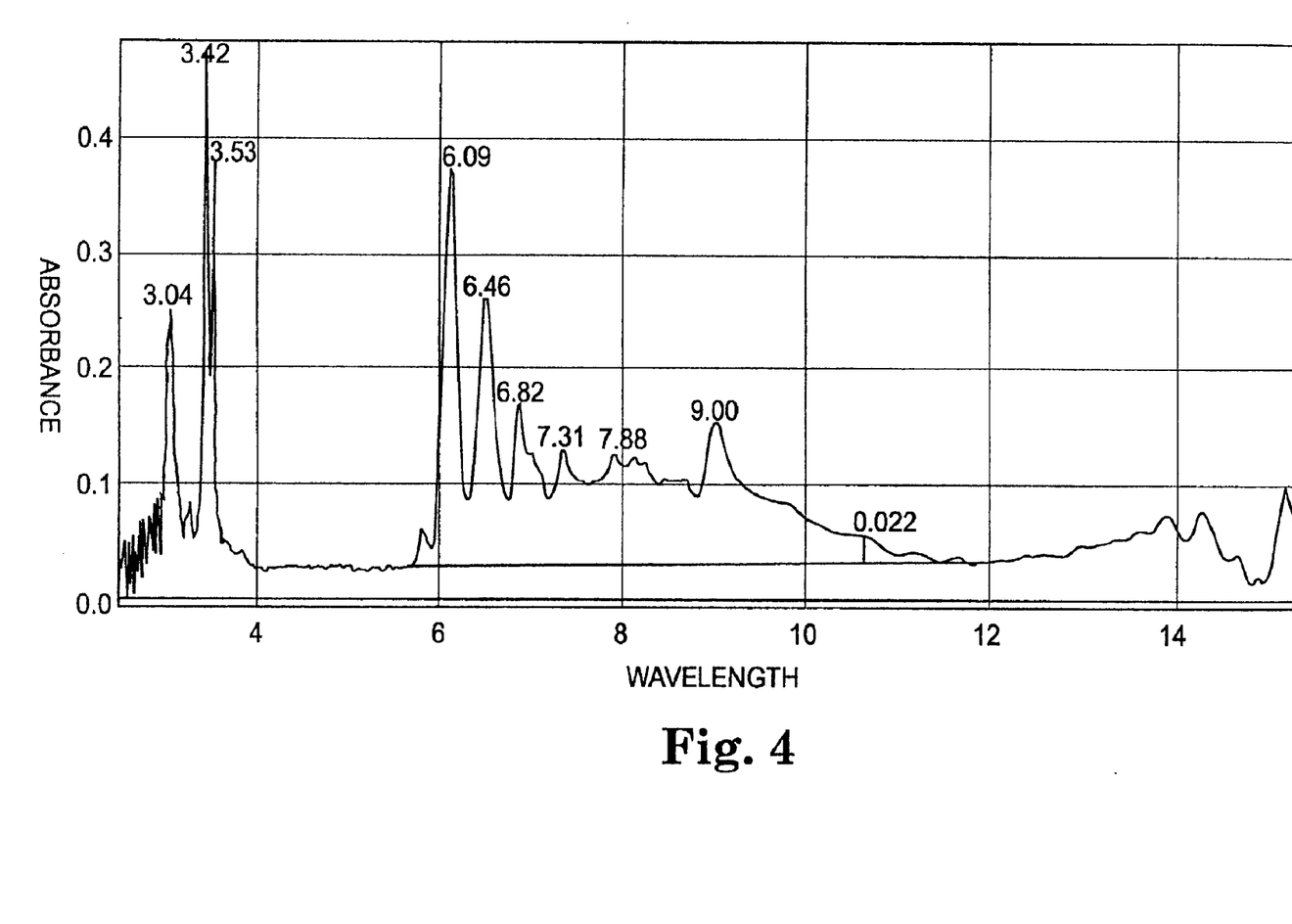
FIG. 4 is an absorbance spectra for a typical polymer material used as a dilatation balloon catheter material.

As described above, the intensity of infrared radiation being emitted from a material at a particular wavelength depends on the temperature of the material and the emissivity of the material at that wavelength. In general, polymeric materials have spectral emissivity curves that contain localized peaks where emission intensity is highest. In FIG. 4, the absorbance with respect to wavelength for a typical polymeric material that may be utilized in balloon catheter applications is shown. As explained above, the absorbance may be considered as equivalent to the emissivity. It can be seen in FIG. 4 that there is one major absorption peak centered at approximately 3.4 microns and smaller peaks from about 6 to about 10 microns. Thus, because the emissivity is high at about 3.4 microns, a range of 2 to 4 microns as determined from the black body curves above may be effectively used for the detector 30.

Further referring to FIGS. 1 and 2, the welding system 10 preferably includes a control system 38 operatively connected to the detector 30 by a signal based connection 40 for controllably adjusting the power of the laser beam 14 in response to the infrared radiation 28 emitted from the fusion zone 26. Preferably, the control system 38 is also connected to the laser 12 by a signal based connection 42. The control system 38 may include a computer or any processor and may further include software for providing a user interface and for providing a generally configurable system.

In a preferred embodiment the processing system 38 utilizes a control algorithm for providing an output signal for controllably adjusting the power of the laser beam 14 in response to an input signal from the detector 30. Preferably, the process control algorithm is a Proportional, Integral, Differential (PID) control. Generally, PID control is a type of feedback control where the output is a control variable (CV). Generally, the control variable (CV) is based on the error between some predetermined set point (SP) and some measured process variable (PV). Each element of the PID controller refers to a particular action taken on the error and may be generally described by the following equation:

$$ControlVariable = P\left((SP-PV) + D\frac{d(SP-PV)}{dt} + I\int (SP-PV)dt\right)$$

Where SP is the setpoint value, PV is the measured process variable, P is the proportional constant, I is the integral constant, and D is the differential constant. It is known that other control algorithms, such as fuzzy logic and neural network control algorithms, may be used such that the functional aspects of the present invention are realized.

In accordance with the present invention the set point (SP) and the process variable (PV) may be temperature values and the control variable may be a power output of the laser beam 14 described above. For example, for the case where the desired temperature is equal to the measured temperature the corresponding laser power output would not change because the process temperature is at the desired set point temperature. However if the measured temperature (process variable) is above or below the set point temperature the laser power output would be reduced or increased respectively. The control variable response characteristics are determined by the particular PID parameters chosen and may generally be determined empirically.

Figure 5:
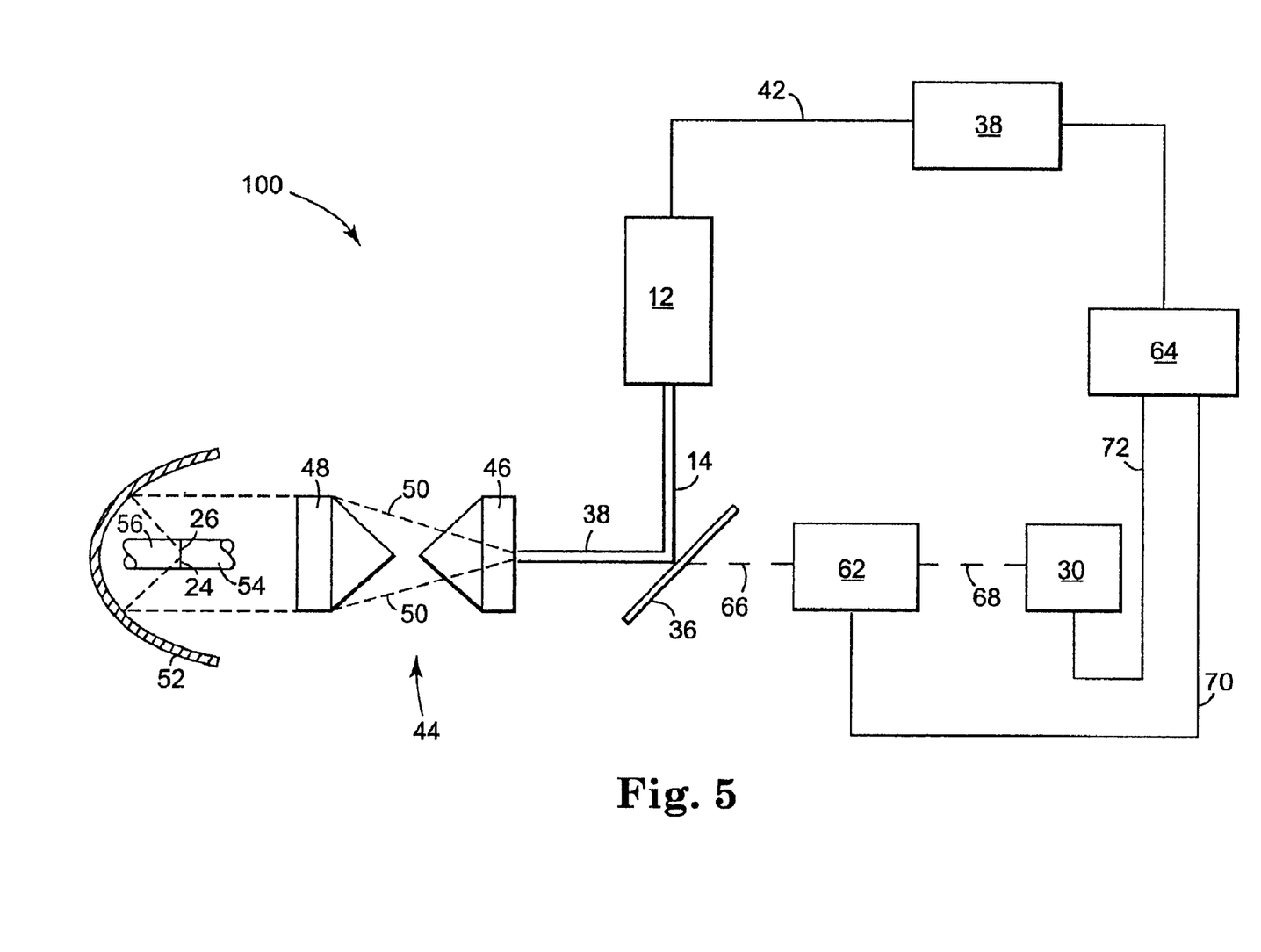
FIG. 5 is a schematic illustration of another alternative arrangement of a laser welding apparatus in accordance with the present invention.

With reference to FIG. 5, yet another welding system 100 in accordance with the present invention is illustrated that is provided for fusing polymeric components. In addition, the welding system 100 may also be advantageously used to fuse polymeric and non-polymeric components together. For example, the welding system 100 may be used to fuse a polymeric component to a stainless steel component. In particular, the welding system 100 that is shown and will be described below is particularly designed for fusing plural polymeric catheter components together. As illustrated in FIG. 6, in one aspect of the present invention a first tubular catheter component 54 is positioned with respect to a second tubular catheter component 56 to be bonded together at facing ends thereof, thus creating a fusion bond site 24. In another aspect of the present invention as illustrated in FIG. 7, a tubular catheter component 58 is positioned with respect to a balloon component 60 to be bonded together at a distal end thereof, thus creating a fusion bond site 24. A second good site 61 is also created between the balloon component 60 and an outer tubular component 59. It is understood that the present invention may be utilized to create other fusion bond arrangements and geometries, such as lap welds, butt welds, seam welds, and the like as well as any other known or developed welding technique whereby components are located with at least portions thereof adjacent one another and thereby forming a fusion bond site in accordance with the present invention.

Similar to the systems 10 and 11 of FIGS. 1 and 2, the welding system 100 preferably has a laser 12 that provides a laser beam 14. Preferably, the laser beam 14 is directed toward and is diverted by a mirror 36. The diverted portion of the laser beam 38 is preferably directed through an optical system 44 for modifying the laser beam 38 and, as described below, for transmitting thermal radiation emitted from the fusion zone 26. Preferably, the optical system 44 is used to refocus the laser beam 38 into a ring or spot or other predetermined shape depending on the application. One such optical system that may be used consists of a set of axicon lenses having a first lens 46 and a second lens 48 for refocusing the laser beam 38 as a hollow cylinder. One such preferable welding system is the subject of currently co-pending and co-assigned U.S. patent application Ser. No. 09/654,987, filed Sep. 5, 2000, and entitled "Method of Applying a Laser Around the Circumference of a Catheter," the entire disclosure of which is incorporated fully within this application by reference.

As illustrated in FIG. 5, the laser beam 38 passes through the first lens 46 that focuses the light as indicated by dashed lines 50 toward the second lens 48 that refocuses the light along the path illustrated by dashed lines 51. The laser beam then impinges upon a mirror 52 that also functions as an infrared radiation collector as described below. The mirror 52 then directs the laser beam to the fusion bond site 24. In an embodiment, the lenses 46 and 48 may focus the beam 38 annularly on the fusion bond site 24. Preferred lenses for the lenses 46 and 48 are Axicon lenses which may be preferably formed from zinc selenide and preferably have a full cone angle of about 160 degrees. A preferred mirror for the mirror 52 is a parabolic mirror having a focal length of about 10 millimeters. As described above, a fusion zone 26 is formed by the impingement of the laser beam on the fusion bond site 24 thereby emitting thermal radiation (not shown). The emitted thermal radiation may then follow the reverse path of the laser beam such that it is directed through mirror 36 and generally along the path indicated by dashed line 66 to an optical chopper 62 as described below. That is, the optical system 44 and the mirror 36 comprise beamsplitters or the like as described above. The thermal radiation may then pass through the optical chopper 62 for improving the signal to noise ratio as described below and continue to the detector 30 by the path generally indicated by dashed line 68.

In a preferred embodiment, the mirror 52 also functions as an infrared radiation collector to enhance detection of infrared radiation by the detector 30. Such a collector may comprise a lens, fiber-optic bundle, parabolic mirror, or other such optical device that gathers infrared emissions from an area larger than the emanating area and then projects such infrared radiation to the infrared detector 30 as described above. Moreover, parabolic or elliptic mirrors are able to capture radiation regardless of the emission angle of infrared radiation emanating from the weld bonding surfaces whereas a lens gathers radiation from only where the lens is directed.

An infrared collector is advantageously preferred because infrared radiation is typically emitted in every direction from a hot surface or region, such as from the fusion zone 26 at a fusion bond site 24 comprising polymeric materials being welded in accordance with the present invention. For weld bonding polymeric catheter components, such weld bonding sites may have surface areas that are very small. Also, the temperatures associated with polymeric weld bonding processes are relatively low. As such, the use of an infrared collector is preferred to get an accurate reading even where very little infrared radiation is emitted. That is, for the relatively low temperatures used for weld bonding polymeric materials and the relatively small heated areas, it is preferable to utilize an infrared collector to enhance the signal to noise ratio of the detected infrared radiation.

Further referring to FIG. 5, the infrared detector 30 is preferably used with the optical chopper 62 and a lock-in amplifier 64 in order to improve the signal to noise ratio of the measured radiation. Generally, the optical chopper 62 optically modulates the infrared radiation and the lock-in amplifier 64 amplifies the modulated radiation and filters out any radiation that has not been modulated at that particular chopping frequency. Preferably, the lock-in amplifier 64 has a signal based connection 70 to the optical chopper 62 and a signal based connection 72 to the detector 30. The optical chopper 62 generally provides a better signal to noise ratio of the thermal signal by using lock-in amplifier 64 as is conventionally known. That is, the thermal signal may be modulated at a predetermined frequency by the optical chopper 62. A reference signal from the optical chopper 62 enables the lock-in amplifier 64 to amplify the modulated signal. Other frequencies that may be received due to noise, such as extraneous thermal radiation from the surroundings, are not amplified. Hence, the signal of interest is amplified and the noise signal is not, thereby improving the signal to noise ratio of the thermal radiation signal.

In accordance with the present invention and as also discussed above, the detector 30, which preferably comprises an infrared detector or infrared sensing pyrometer, is positioned to receive the thermal radiation 28 emitted from the fusion zone 26 as the polymeric components are heated and thereby fused. By sensing the infrared radiation 28, signal based information may be provided which information can be advantageously used to controllably determine a desired output power of the laser beam 14. Moreover, the actual temperature of the materials, whether molten, softened or solid, at the fusion zone 26 can be determined by correlation to the detected thermal radiation. Thus, the fusion zone 26 can be heated by controllably ramping up the heat generated by the laser beam 14 up to a sufficient temperature for creating a fusion bond at the bond site 24 and then to controllably ramp down the generated heat as the weld progresses to completion. As such, a feedback circuit comprising the detector 30 and the laser 12 can effectively create a fusion bond without underheating or overheating the fusion zone 26. In a similar sense, any desired ramp up and down pattern can be effectively controlled based upon actual temperature readings of the fusion zone 26 to controllably fuse or soften deform or otherwise modify the components.

Figure 8:
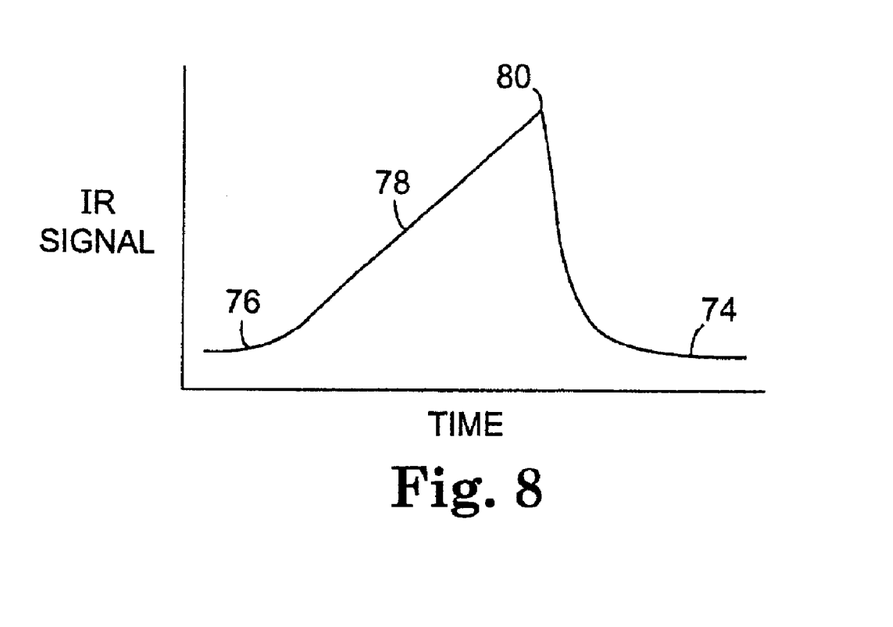
FIG. 8 is an exemplary graph of an infrared signal with respect to time for a laser welding process where the laser beam is provided at a constant power.

In one aspect of the present invention, the detector 30 senses infrared radiation 28 emitted from the fusion zone 26 of a bond site 24 as is shown in FIGS. 1, 2, and 5. In FIG. 8, an exemplary graph of the sensed infrared signal 74 with respect to time is shown for a constant laser beam power. It is understood that the infrared signal 74 may be any signal provided by the detector 30 such as a conventional voltage or current based signal and that the infrared signal may substantially correspond to temperature.

In FIG. 8, the infrared signal 74 is illustrated as initially constant with time as indicated by reference numeral 76. That is, the temperature is constant, as the laser beam has not started to heat the materials yet. With reference to FIGS. 1, 2 and 5, the laser beam 14 is applied to the bond site 24, at a constant predetermined power, and a fusion zone 26, generally emitting more thermal radiation 28 than the adjacent region 27, is created. The sensed change in thermal radiation 28 over time is indicated by reference numeral 78 in FIG. 8. As illustrated the sensed radiation generally increases over time and therefore the temperature of the fusion zone 26 generally increases over time until the laser beam 14 is turned off at the point indicated by reference numeral 80. Once the laser beam is turned off the sensed thermal radiation generally returns to the level that was present before the laser beam was applied. That is, the fusion zone 26 cools accordingly.

Figure 9:
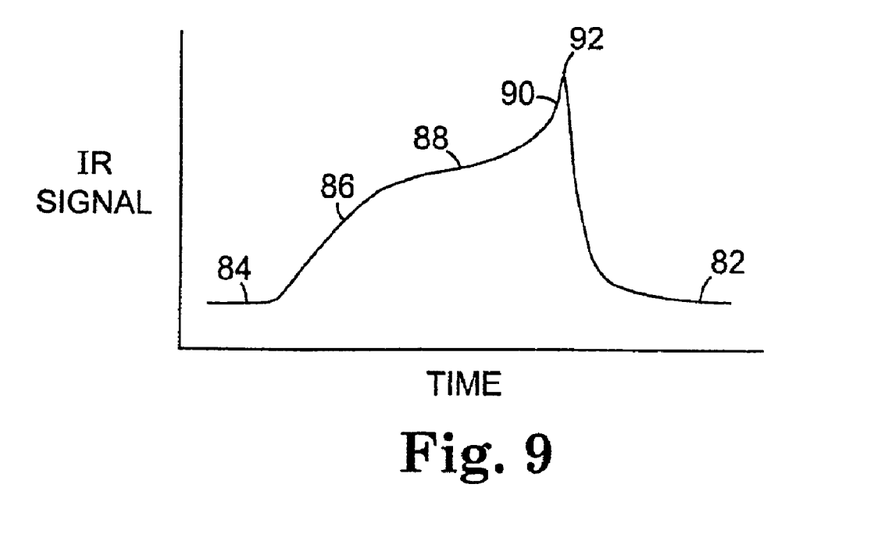
FIG. 9 is an exemplary graph of an infrared signal with respect to time for a laser welding process where the laser beam is provided at a constant power and is moved from one polymeric material to a second differing polymeric material; and, FIG. 10 is an exemplary graph of an infrared signal and the corresponding laser power used to obtain the infrared signal for a fusion bonding process for welding polymeric material in accordance with the present invention.

In FIG. 9 another exemplary graph of infrared radiation 28, is shown as sensed by the detector 30 with respect to time. In FIG. 9, the infrared signal 82 is illustrated for a bond site 24 comprising differing polymeric materials where a laser beam moves from one material to the second material to form a fusion bond between the two materials. As can be seen in FIG. 9 the infrared signal is initially constant as indicated by reference numeral 84. As shown, as the laser beam is applied to the first material at a predetermined constant power, the infrared signal generally increases over time as is indicated by reference numeral 86. And as the laser beam begins to pass from the first material to the second material the infrared signal generally decreases as indicated by reference numeral 88 and then sharply increases as is indicated by reference numeral 90. The laser beam is turned off at a point indicated by reference numeral 92 and the infrared signal substantially decreases as the material cools.

The infrared radiation spectrum sensed by the detector 30, as illustrated in FIGS. 8 and 9, may be used as described below, for providing control aspects to the bonding process. That is, the sensed radiation is preferably utilized for providing feedback to the laser in order to controllably adjust the laser beam power that is directed to the bond site. Further, it is specifically contemplated that the infrared radiation spectrum sensed by the detector 30 may be utilized for characterizing other aspects and features of the bonding process such as quality control or endpoint detection features. For example, the shape of the radiation spectrum sensed by the detector 30 and/or the corresponding laser control signal may be utilized to evaluate characteristics of the bonding process. It is understood that aspects of the bonding process such as voids, bubbles, delamination, inclusions and other weld defects, as well as quality aspects such as material identification (for example, identification of incorrect parts) may be characterized by the present invention.

Figure 10:
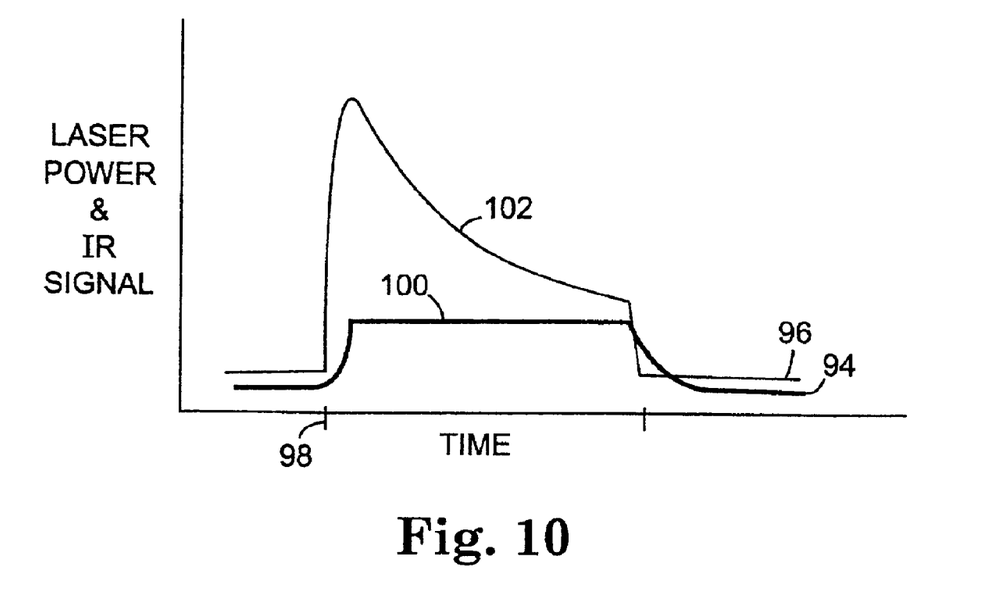

A graphical illustration of a control aspect in accordance with the present invention is illustrated in FIG. 10. As is shown FIG. 10, the infrared signal 94 and the laser beam power 96 are illustrated with respect to time. Reference numeral 98 indicates the point in time where the laser beam is applied to the bond site. As illustrated, both the laser beam power and the infrared signal increase rapidly. However, as the infrared signal approaches a predetermined value, for example, a value correlated to a desired temperature, the laser power is controllably adjusted by the control algorithm of the processing unit as is described above. As such, a constant infrared signal with respect to time corresponding to the predetermined value may be maintained as is illustrated by reference numeral 100. As shown in FIG. 10 by reference numeral 102, the laser power generally decreases in order to maintain the constant infrared signal 100. Such control is advantageous in that overheating may be prevented especially where fusion bonds are made between differing materials. For example, a laser beam moving from one material to another material may be controlled so as not to overheat either of the materials.

The present invention is not limited to the above described preferred apparatus. Furthermore, it should be understood that, while particular embodiments of the invention have been discussed, this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

What is claimed is:

1. A method for forming a fusion bond between a first polymeric body and a second body comprising the steps of:
   forming a bond site by positioning a portion of the first polymeric body with respect to a portion of the second body so that a fusion bond is formed;
   directing laser energy at a bonding wavelength based at least upon the polymeric material of the first polymeric body onto at least a portion of the first polymeric body within the bond site so that a fusion zone is formed by increasing the temperature of at least the portion of the first polymeric body, the laser energy being directed to the bond site thus creating a controllable emissive power spectrum of the fusion zone;
   detecting a selected wavelength range of the emissive power spectrum of infrared radiation being emitted from the fusion zone while directing the laser energy onto the bond site, the wavelength range being selected based at least in part upon the polymeric material of the first polymeric body;
   converting the selected wavelength range of the detected emissive power spectrum of infrared radiation into an electrical signal; and
   controllably adjusting the laser energy that is directed onto the bond site based on the electrical signal to controllably obtain the selected wavelength range of the emissive power spectrum of infrared radiation emitted from the fusion zone.

2. The method of claim 1, wherein the second body is a second polymeric body.

3. The method of claim 1, wherein the second body is a stainless steel body.

4. The method of claim 1, wherein the first polymeric body of the forming step is a tubular catheter and the second body of the forming step is a polymeric dilatation balloon.

5. The method of claim 1, wherein the directing step comprises directing laser energy provided by a laser beam from $CO_2$ laser, the laser energy having a bonding wavelength of about 10.6 microns.

6. The method of claim 1, wherein the directing step comprises directing laser energy as a laser beam such that the laser beam impinges on the bond site at an angle between about 45 degrees and about 90 degrees.

7. The method of claim 1, wherein the directing step comprises directing laser energy as a laser beam such that the laser beam impinges on the bond site at a substantially normal angle of incidence.

8. The method of claim 1, wherein the detecting step comprises detecting the emissive power spectrum of infrared radiation being emitted from the fusion zone by a radiation detecting device.

9. The method of claim 8, wherein the radiation detecting device comprises a mercury-cadmium-telluride detector.

10. The method of claim 1, wherein the directing step further comprises directing the laser energy to the bond site with a mirror.

11. The method of claim 10, wherein the directing step comprises directing laser energy as a laser beam such that the laser beam impinges on the bond site at a substantially normal angle of incidence.

12. The method of claim 11, wherein the directing step comprises directing laser energy as a laser beam such that the laser beam impinges on the bond site at an angle between about 45 degrees and about 90 degrees.

13. The method of claim 12, wherein the detecting step comprises detecting the emissive power spectrum with a detector positioned on axis with at least a portion of the laser beam that is directed to the bond site.

14. The method of claim 13, wherein the mirror is a dichroic mirror.

15. The method of claim 1, wherein the controllably adjusting step comprises operatively connecting a control system to a detector by a signal based connection and operatively connecting the control system to a laser by a signal based connection.

16. The method of claim 15, further comprising providing an output signal from the control system for receipt of the laser by using a process control algorithm for controllably adjusting the power of the laser energy in response to the electrical signal of the converting step.

17. The method of claim 16, wherein the process control algorithm is a PID control algorithm.

18. The method of claim 1, further comprising directing the laser energy to an optical system with a first mirror, refocusing the laser beam to a predetermined shape with the optical system, and directing the laser energy to the bond site with a second mirror.

19. The method of claim 18, wherein the optical system comprises a first lens and a second lens for refocusing the laser energy as a hollow cylinder.

20. The method of claim 19, wherein the first mirror is a dichroic mirror and the second mirror is a parabolic mirror.

21. The method of claim 20, further comprising improving the signal to noise ratio of the detected infrared radiation by optically modulating and amplifying the infrared radiation and filtering out the radiation which is not modulated.

22. The method of claim 1, wherein the forming step comprises forming a bond site by positioning a portion of a first tubular catheter component with respect to a portion of a second tubular catheter component so that a substantially circular fusion bond site is formed.

23. The method of claim 1, wherein the forming step comprises forming a bond site by positioning a portion of a tubular catheter component with respect to portion of a dilatation balloon so that a substantially circular fusion bond site is formed.

24. The method of claim 1, wherein the selected wavelength range of the detected emissive power spectrum of infrared radiation is a wavelength range between 2 and 4 microns.

25. A method for forming a fusion bond between a plurality of components of a balloon catheter system having at least one polymeric material component comprising the steps of:
   forming a bond site by positioning a portion of a tubular catheter component with respect to a portion of a dilatation balloon so that a substantially circular fusion bond is formed;
   directing laser energy at a bonding wavelength based at least upon the polymeric material of a component onto at least a portion of the bond site so that a fusion zone is formed by increasing the temperature of at least a portion of the polymeric component, the laser energy being directed to the bond site thus creating an emissive power spectrum of the fusion zone;

detecting a selected wavelength range of the emissive power spectrum of infrared radiation being emitted from the fusion zone while directing the laser energy onto the bond site, the wavelength range being selected based at least in part upon the polymeric material of the at least one polymeric component;

converting the selected wavelength range of the detected emissive power spectrum of infrared radiation into an electrical signal; and controllably adjusting the laser energy that is directed onto the bond site based on the electrical signal to controllably obtain the selected wavelength range of the emissive power spectrum of infrared radiation emitted from the fusion zone.

26. The method of claim 25, wherein the tubular catheter component is a polymeric catheter component.

27. The method of claim 25, wherein the directing step comprises directing laser energy provided by a laser beam from CO2 laser, the laser energy having a bonding wavelength of about 10.6 microns.

28. The method of claim 25, wherein the directing step comprises directing laser energy as a laser beam such that the laser beam impinges on the bond site at an angle between about 45 degrees and about 90 degrees.

29. The method of claim 25, wherein the directing step comprises directing laser energy as a laser beam such that the laser beam impinges on the bond site at a substantially normal angle of incidence.

30. The method of claim 25, wherein the detecting step comprises detecting the emissive power spectrum of infrared radiation being emitted from the fusion zone by a radiation detecting device.

31. The method of claim 30, wherein the radiation detecting device comprises a mercury-cadmium-telluride detector.

32. The method of claim 25, wherein the directing step further comprises directing the laser energy to the bond site with a mirror.

33. The method of claim 32, wherein the directing step comprises directing laser energy as a laser beam such that the laser beam impinges on the bond site at a substantially normal angle of incidence.

34. The method of claim 33, wherein the directing step comprises directing laser energy as a laser beam such that the laser beam impinges on the bond site at an angle between about 45 degrees and about 90 degrees.

35. The method of claim 34, wherein the detecting step comprises detecting the emissive power spectrum with a detector positioned on axis with a portion of the laser beam that is directed to the bond site.

36. The method of claim 35, wherein the mirror is a dichroic mirror.

37. The method of claim 25, wherein the controllably adjusting step comprises operatively connecting a control system to the detector by a signal based connection and operatively connecting the control system to a laser by a signal based connection.

38. The method of claim 37, further comprising providing an output signal from the control system by using a process control algorithm for controllably adjusting the power of the laser energy in response to the electrical signal of the converting step.

39. The method of claim 38, wherein the process control algorithm is a PID control algorithm.

40. The method of claim 25, further comprising directing the laser energy to an optical system with a first mirror, refocusing the laser beam to a predetermined shape with the optical system, and directing the laser energy to the bond site with a second mirror.

41. The method of claim 40, wherein the optical system comprises a first lens and a second lens for refocusing the laser energy as a hollow cylinder.

42. The method of claim 41, wherein the first mirror is a dichroic mirror and the second mirror is a parabolic mirror.

43. The method of claim 25, further comprising improving the signal to noise ration of the detected infrared radiation by optically modulating and amplifying the infrared radiation and filtering out the radiation which is not modulated.

44. The method of claim 25, wherein the selected wavelength range of the detected emissive power spectrum of infrared radiation is a wavelength range between 2 and 4 microns.

* * * * *